United States Patent Office 3,144,096
Patented Aug. 11, 1964

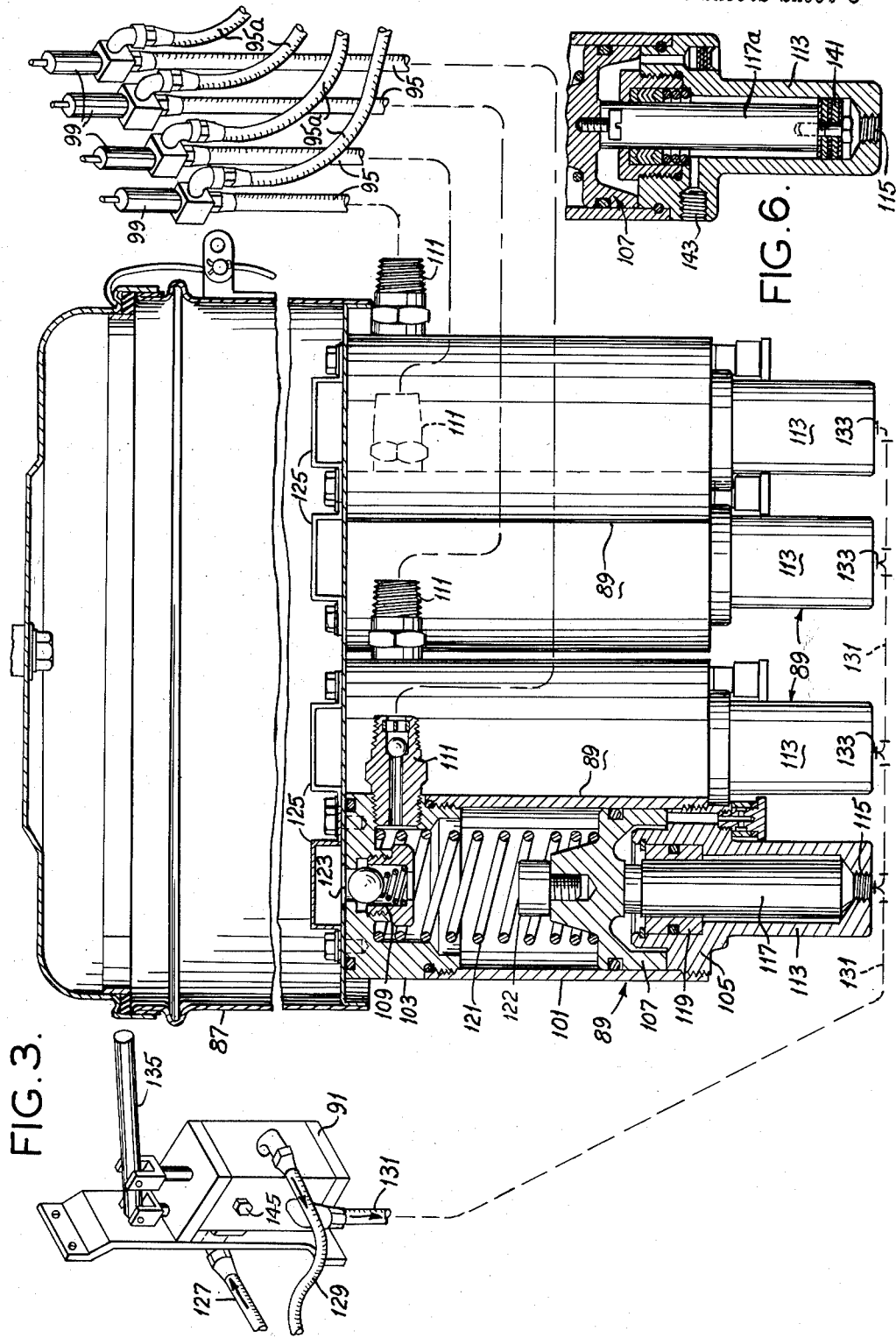

3,144,096
LUBRICATING APPARATUS
Lutwin C. Rotter, Ladue, Mo., assignor to The McNeil Machine & Engineering Company, Akron, Ohio, a corporation of Ohio
Filed Mar. 12, 1962, Ser. No. 179,133
5 Claims. (Cl. 184—7)

This invention relates to lubricating apparatus, and more particularly to lubricating apparatus for a self-propelled cotton picker.

A typical cotton picker comprises one or two so-called picking units, each unit including a pair of vertical rotary drums for picking one row of cotton. Each drum includes a plurality of so-called picker bars extending vertically in an array around the drum. Each picker bar is tubular and has a spindle drive shaft extending vertically therein. A plurality of cotton-picking spindles extend outward from each picker bar, one above another, and are driven from the drive shaft in the picker bar by gearing housed in the picker bar. The picker bars are journalled for oscillation on their vertical axes. In the operation of the cotton picker, each drum rotates on its vertical axis, carrying the picker bars around with it, each picker bar is oscillated on its vertical axis, and each spindle drive shaft is rotated to drive the spindles.

Frequent lubrication of the picker bars is required to avoid wear of the gearing therein, the spindle journals, and other parts. Heretofore, lubrication of the picker bars has been manually effected with a grease gun via a lubrication fitting on each picker bar. It is recommended that the picker bars be lubricated every twenty hours of operation, for example. Manual lubrication with a grease gun is a time-consuming operation (noting that there may be as many as sixteen picker bars on one drum, for example), and can be carried out only when the cotton picker is out of use. Moreover, manual lubrication with a grease gun is an inexact operation, and may result in application of excess grease to a picker bar with the result that grease leaks out through the spindle bearings, or other bearings, and strains the cotton being picked, or in application of too little grease for adequate lubrication.

Accordingly, among the several objects of this invention may be noted the provision, in a cotton picker of the class described, of a lubricating system for automatically effecting lubrication of the picker bars, which may be operated while the cotton picker is in use, and which meters the amount of lubricant delivered to each picker bar to provide for adequate lubrication while avoiding excessive lubrication and stained cotton; the provision of such a system which does not interfere with the complex motion of the various parts (noting that each spindle rotates on its own axis, rotates around with the drum, and oscillates on the axis of the respective picker bar); and the provision of such a system which is reliable and efficient in use. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a fragmentary perspective illustrating a cotton picker equipped with a lubrication system of this invention;

FIG. 3 is a view with parts broken away and shown in section illustrating certain parts of the system;

FIG. 6 is a section showing a pump modification.

Corresponding reference characters indicate corresponding parts throughout the several views of the drawings.

Figure 1:
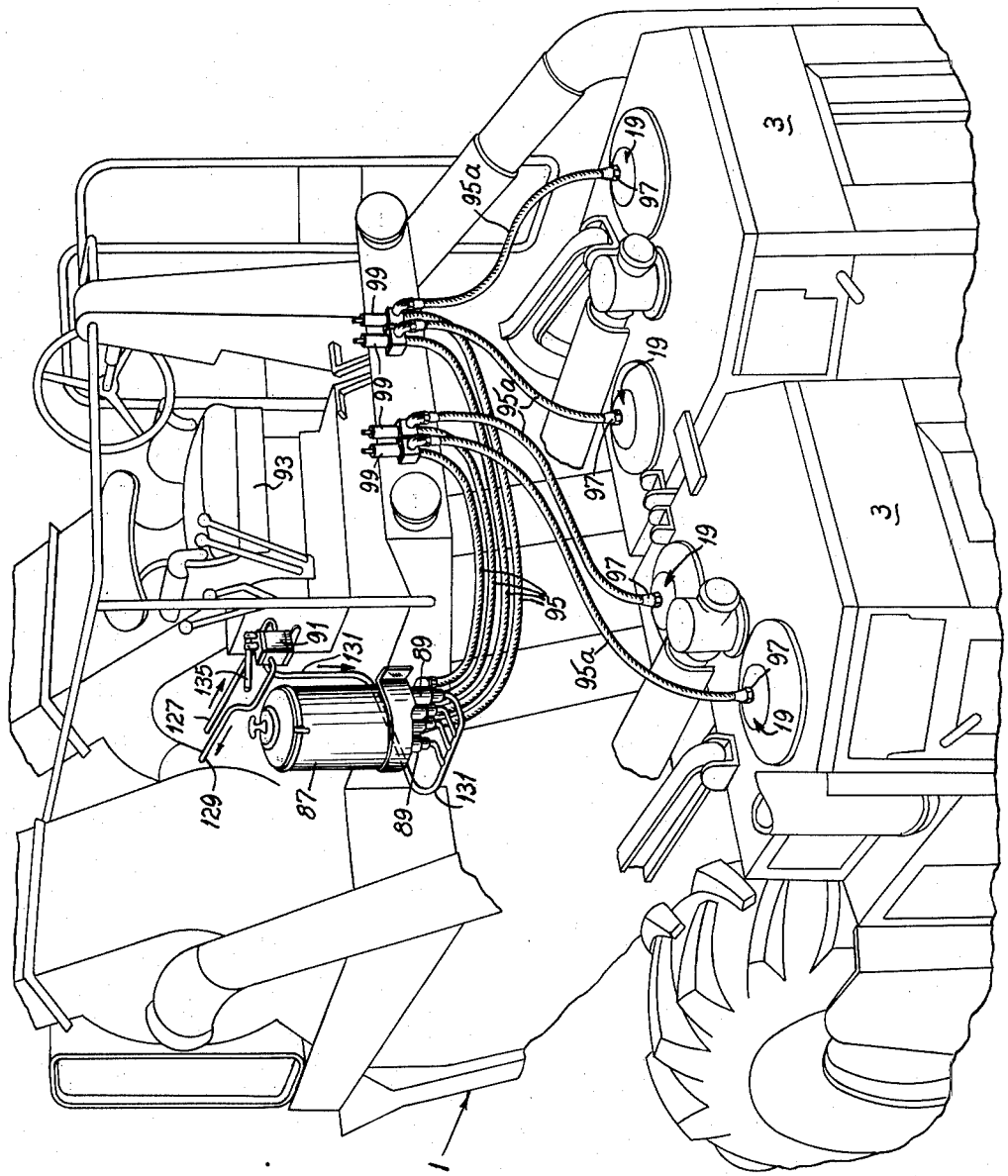
Figure 2:
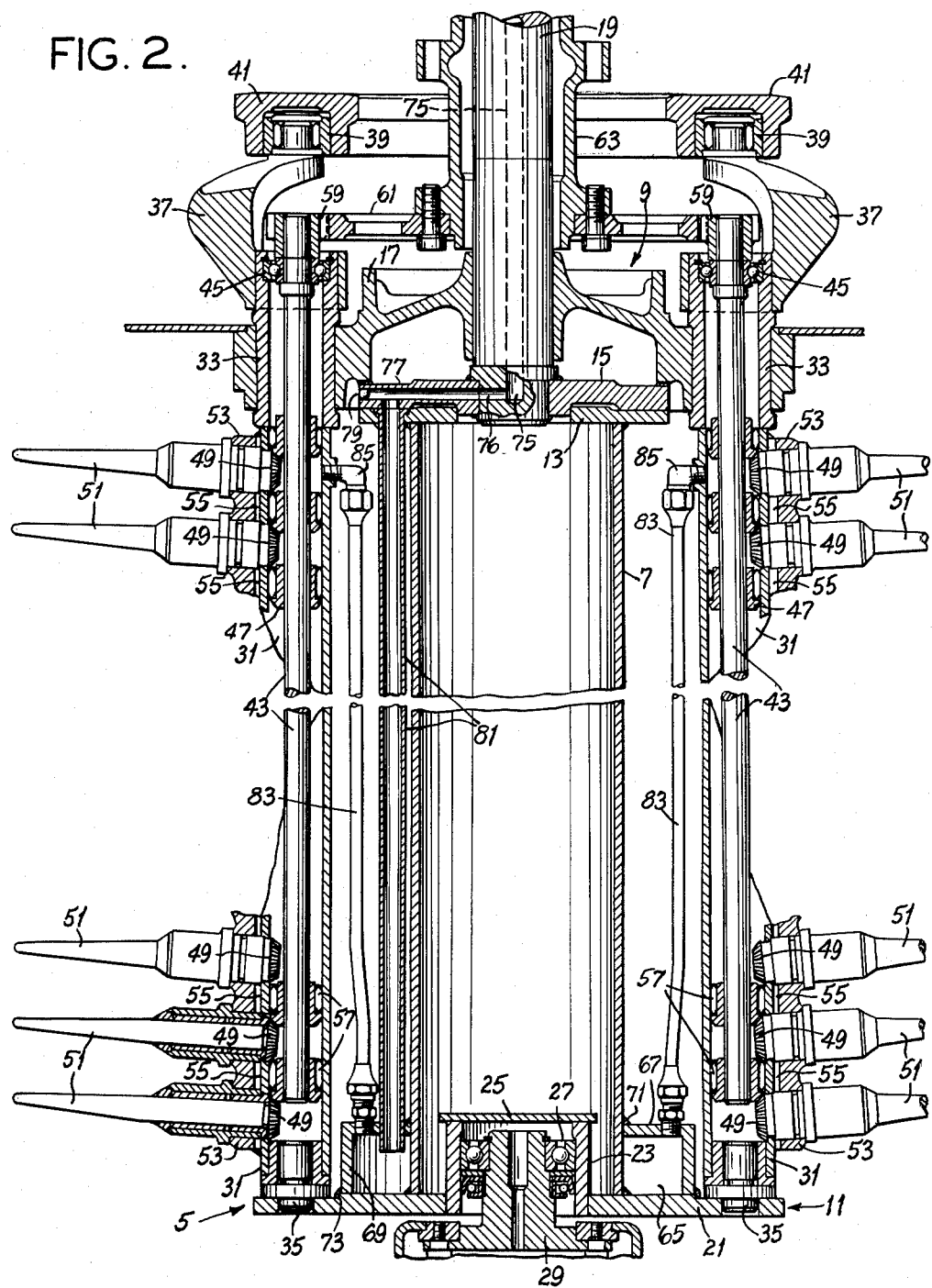
FIG. 2 is a vertical section of one of the drums of the cotton picker.

Referring first to FIG. 1 of the drawings, there is indicated at 1 a typical cotton picker of a type referred to as a two-row self-propelled cotton picker (for picking two rows of cotton). The cotton picker includes two picking units, each designated 3. Each picking unit contains two vertical drums, each of these being of a construction such as illustrated in FIG. 2, wherein the drum is designated 5. As shown in FIG. 2, the drum comprises a cylindrical barrel 7 having upper and lower head assemblies 9 and 11. The upper head assembly 9 comprises a plate 13 secured as by welding to the upper end of the barrel, a plate 15 on top of plate 13 and secured as by bolting to the latter, and a spider 17 on top of plate 15 secured as by bolting to the latter. A vertical drive shaft 19 for the drum extends upward from the upper head assembly 9, being secured as by welding to plate 15. As will be understood by those familiar with cotton pickers, this shaft is journalled in the picking unit 3 and has drive means connected thereto for driving it to rotate the drum. The lower head assembly comprises a circular plate 21 with an upwardly extending center ring 23 and a cover 25 on the ring housing a bearing 27 on a fixed pivot 29 located in the picking unit 3.

A plurality of picker bars 31 extend vertically between spider 17 and plate 21 spaced at intervals around the barrel 7. Each picker bar comprises a tube (shown broken away in FIG. 2) having an upper pivot section 33 journalled in the spider 17 and having its lower end journalled on a pivot 35 on plate 21. Each picker bar is thereby oscillatable on its axis, and for oscillating each bar there is provided an arm 37 on the upper end of the upper pivot section 33 carrying a cam follower roller 39 engaged in a track in a cam 41 in picking unit 3. A spindle drive shaft 43 extends vertically in each picker bar through a bearing 45 at the upper end of the bar. Bevel gears 47 on the shaft mesh with bevel gears 49 at the inner ends of spindles 51 journalled at 53 in the picker bar and extending laterally outward therefrom at a slight angle. Passages such as indicated at 55 interconnect the spindle journals. Certain of the bevel gears 47 may have bearings such as indicated at 57 around their hubs for journalling the shaft 43. Each shaft 43 has a pinion 59 on its upper end in mesh with a gear 61 on a quill 63 surrounding shaft 19. As will be understood by those familiar with cotton pickers, quill 63 and gear 61 are driven to rotate spindle drive shafts 43, hence to rotate spindles 51, at relatively high speed.

In accordance with this invention, a lubricant manifold 65 is provided in the lower end of the drum. This manifold is defined by a ring-shaped member having a circular top wall 67 and a cylindric vertical wall 69 extending down from the periphery of top wall 67. Wall 67 has a central opening receiving the barrel 7, and wall 67 is welded to the barrel at 71 and wall 69 is welded to plate 21 at 73 in such manner as to seal the manifold. Shaft 19 has an axial lubricant passage 75 extending down from its upper end to a horizontal passage 76 adjacent its lower end, which communicates with a passage 77 in plate 15 extending radially outward from the shaft 19 on plate 13, the outer end of this passage being plugged at 79. A pipe 81 extends vertically on the outside of barrel 7 connecting passage 77 and the lubricant manifold 65. Flexible lubricant distribution lines 83 (such as flexible plastic tubes) extend upward from the lubricant manifold 65 to connections at 85 with the picker bars. Lines 83 are flexible to permit oscillation of the picker bars. Connections 85 are located toward the upper end of the drum.

Figure 4:
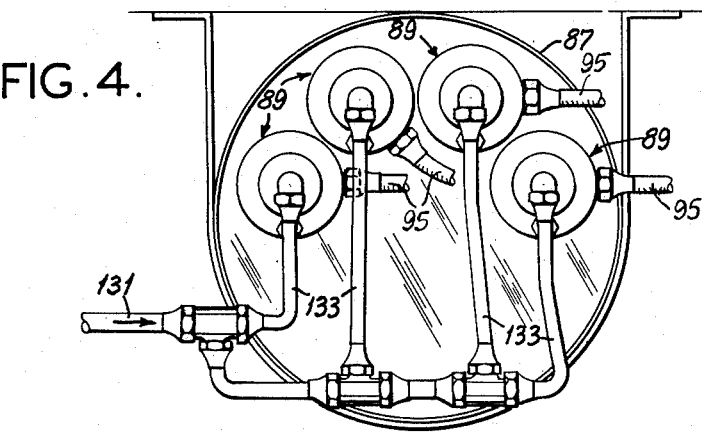
FIG. 4 is a bottom plan of part of FIG. 3 on a reduced scale.

Now referring to FIGS. 1, 3 and 4, there is shown a lubricant supply container or tank 87 mounted on the cotton picker. On the bottom of this tank are four lubricant metering lubricant pumps each designated 89. These pumps are hydraulically operated via a source of hydraulic pressure such as is conventional on cotton pickers of the class under consideration, under control of a valve 91 mounted on the body of the cotton picker in position for convenient operation by the driver of the cotton picker sitting in the driver's seat 93. The pumps are charged with lubricant from the container 87, and, on a pressure stroke thereof, deliver metered amounts of lubricant via four delivery lines each designated 95 to a respective drum. In FIG. 1, the upper ends of shafts 19 are shown, and it will be observed that lines 95 are connected to swivel fittings 97 at the upper ends of the shafts, these swivel fittings permitting rotation of the shafts and the drums 5. Lubricant flow indicators may be provided in each of lines 95 as indicated at 99. The indicators are mounted on the body of the cotton picker, and lines 95 include flexible line portions 95a extending from the indicators to the swivels 97 to allow for lifting and lowering of the picking units 3.

Each pump 89 (see FIG. 3) comprises a cylinder 101 having upper and lower heads 103 and 105 and a piston 107 slidable therein. The upper head 103 has a check-valved inlet 109 and a check-valved outlet 111. The lower head 105 has a downward cylindrical extension 113 having a port 115 at its lower end. Extension 113 constitutes an operating cylinder. Piston 107 has a plunger 117 extending downward therefrom through a seal 119 into extension 113, and is biased downward by a spring 121. Piston 107 has a screw 122 threaded in its upper end. The head of this screw is engageable with the lower end of the inlet check valve to determine the stroke of the piston and hence the output of the pump. By removing this screw, the output may be increased. Each pump has its upper head secured in sealed relation to the bottom of the tank 87 with the pump inlet 109 registering with a hole 123 in the bottom of the tank. Baffles 125 of inverted U-shape are provided on the bottom of the tank over holes 123. Valve 91 has a pressure line 127 connected thereto from the source of hydraulic pressure on the cotton picker and a vent line 129 connected thereto for return of hydraulic fluid to the source. A line 131 extending from the valve has branch connections such as indicated at 133 to the ports 115 at the lower ends of extensions 113. Valve 91 has an operating lever 135 movable from a retracted position wherein line 131 is connected to line 129 for venting extensions 113 to an operative position connecting pressure line 127 to line 131 for supplying hydraulic fluid under pressure to the extensions 113. Lubricant delivery lines 95 extend from the pump outlets 111.

Operation is as follows:

Whenever valve-operating lever 135 is moved to retracted position, the lower ends of operating cylinders 113 are vented, and the piston 107 of each pump 89 is driven downward by the respective spring 121 for charging cylinder 101 of each pump with lubricant from container 87. The lubricant is conventionally a grease. On moving lever 135 to operative position, hydraulic fluid under pressure is delivered to the lower ends of operating cylinders 113 to drive the plunger 117 and piston 107 of each pump upward, thereby to force a measured charge of lubricant through the outlet 111 of each pump and thence through the respective lubricant delivery line 95, 95a, and swivel 97 to the passage 75 in the respective shaft 19. It will be understood that each lubricant delivery line 95, 95a, the passages 75 in each shaft 19, and the passage 77, pipe 81 and manifold 65 of each drum 5 of the cotton picker will have been primed with lubricant as a result of previous operation. Upon delivery of the measured charge of lubricant through each line 95, 95a, a corresponding amount of lubricant is forced out of manifold 65 and delivered through the flexible distribution lines 83 to the picker bars 31, apportioned among the picker bars. The amount of the charge is sufficient for effective lubrication without being excessive so as to avoid undue leakage of lubricant from the picker bars, thereby avoiding staining of the cotton being picked. A typical amount of charge is about three-eighths of a pound for a drum with twelve picker bars, one-half pound for a drum with sixteen picker bars. Three-eighths of a pound is delivered with screw 122 in place; one-half pound is delivered with this screw removed. Thus, about one thirty-second of a pound is delivered to each picker bar. This relatively small amount delivered to each picker bar oozes down within the bar effectively to lubricate the gearing and the spindle journals, without such excessive lubrication as to cause undue leakage and staining of cotton. Passages 55 enable by-passing of lubricant around such gears 47 as may have bearings 57 therearound. Gears 47 toward the upper end of the shafts 43 immediately above connections 85 act at least to some extent as slingers to sling lubricant upward to the upper ends of the picker bars for lubrication of bearings 45. Other gears in the picker bars also act at least to some extent as slingers to facilitate distribution of lubricant throughout the picker bars.

Heretofore, it has been customary to load each picker bar with about twenty pounds of grease once every twenty hours of operation with a grease gun as mentioned above. This may cause excessive leakage of grease with resultant staining of cotton, and inadequate lubrication after some hours of operation. With the present invention, it is possible to effect lubrication in relatively small metered amounts (e.g., one thirty-second of a pound to each picker bar) at frequent intervals (e.g., at one-half hour intervals) while the cotton picker is in operation, to effect adequate lubrication with assurance against excessive lubrication, and using much less grease. Putting the lubricant into the picker bars from a manifold at the lower end of the drum via connections to the bars located toward their upper ends enables substantially uniform distribution of small amounts of lubricant to the picker bars using only one lubricant metering device for each drum. By reason of the lubricant having to travel upward from the manifold to the picker bars, a back pressure is established which tends to provide more equal distribution of grease to the various picker bars. Without such back pressure, the sudden discharge of lubricant from each pump when valve 91 is actuated might cause more lubricant to be delivered to some picker bars than to others if there should be less resistance to delivery of lubricant to some bars than to others. Also, the arrangement utilizing the relatively long flexible tubes 83 facilitates removal of the picker bars for servicing.

Figure 5:
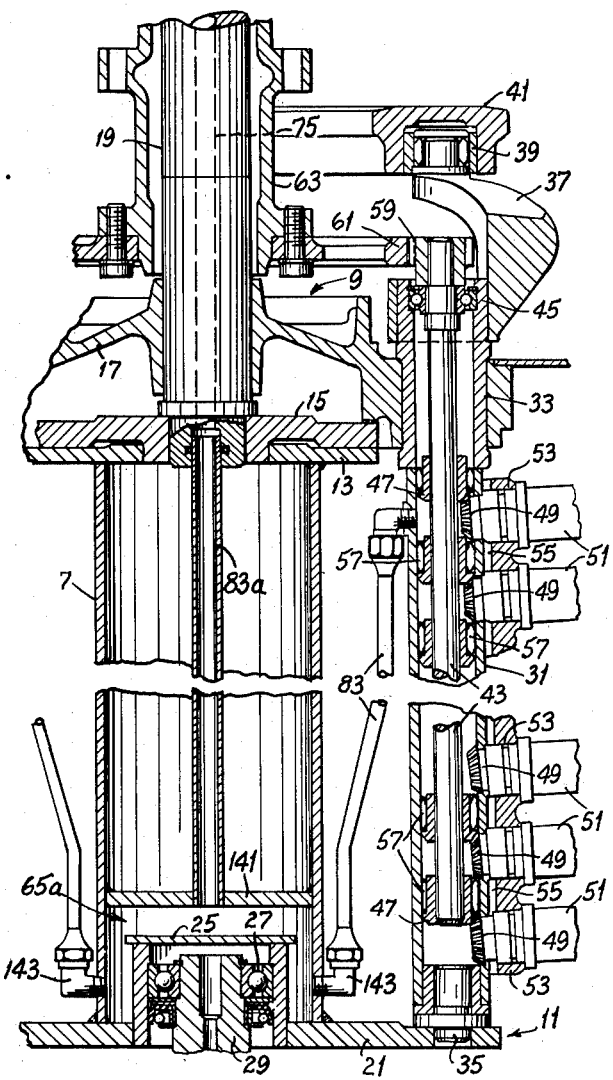
FIG. 5 is a section similar to FIG. 2 showing a modification.

FIG. 5 shows a modification in which the lubricant manifold, here designated 65a, is located within barrel 7 at its lower end (instead of surrounding the barrel as in FIG. 2). Lubricant flows from passage 75 in shaft 19 down through a pipe 83a which extends down from shaft 19 centrally of barrel 7. Manifold 65a is provided by affixing (as by welding) a circular plate 141 in the barrel spaced upward from its lower end, and the lower end of pipe 83a extends into a center hole in this plate. Accordingly, in this instance the manifold is exteriorly constituted by the lower portion of the barrel and in part by a portion of the lower head plate 21, where in FIG. 2 the manifold is interiorly constituted by the lower portion of the barrel and in part by a portion of the lower head plate 21. In FIG. 5, lines 83 are connected to the manifold 65a by L-shaped fittings 143 threaded in the barrel, where in FIG. 2 they are connected to the manifold 65 by straight fittings threaded in holes in top wall 67 of the manifold.

As shown in FIG. 3, each pump 89 is actuated through a pressure stroke by pressure below the plunger 117 and returned by spring 121. It will be understood that each pump 89 may, if desired, be pressure-actuated in both directions. This is illustrated in FIG. 6, where the plunger, designated 117a, is shown as of smaller diameter than the internal diameter of operating cylinder 113 with a piston 141 on its lower end. Operating cylinder 113 is provided with an upper port 143. Spring 121 is omitted. Plug 145 of valve 91 is removed, and a line (not shown) is connected between the unplugged valve port and port 143. The arrangement is such that with operating lever 135 of valve 91 in retracted position, the lower end of operating cylinder 113 is vented and pressure is supplied to the upper end of operating cylinder 113 to retract (lower) piston 107. When lever 135 is moved to operative position, pressure is supplied to the lower end of operating cylinder 113 and the upper end of cylinder 113 is vented to drive piston 107 upward through a pressure stroke.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In a cotton picker having a vertical rotary drum comprising a vertical cylindrical barrel having upper and lower heads, tubular picker bars extending vertically between said heads on the outside of the barrel, each picker bar being carried by said heads for oscillation on its vertical axis, and having spindles journalled therein and extending outward therefrom, and drive means in each picker bar for the respective spindles, a lubricating system for the picker bars comprising a lubricant container on the cotton picker, said drum carrying a lubricant manifold, means for delivering measured charges of lubricant from the container to said manifold comprising a reciprocating lubricant pump having an inlet connected to the container, means connecting the outlet of the pump to the manifold and including a delivery connection permitting rotation of the drum, fluid pressure means for operating the pump, and connections from said manifold to said picker bars, said last-named connections comprising flexible tubes connecting the manifold and the picker bars and being such as to permit oscillation of the picker bars, said manifold being at the lower end of the drum, and said flexible tubes being connected to the picker bars adjacent the upper ends of the picker bars, said drum including a vertical shaft extending upward from its upper head, said delivery connection comprising a swivel connection to the upper end of said shaft, said shaft being passaged for flow of lubricant from said swivel connection, said manifold surrounding said barrel at the lower end thereof, and lubricant being delivered to the manifold from the passage in said shaft via a pipe extending down from the upper head on the outside of the barrel.

2. In a cotton picker as set forth in claim 1, said manifold being interiorly constituted by the lower portion of the barrel and constituted in part by a portion of the lower head.

3. In a cotton picker having a vertical rotary drum carrying a plurality of vertically extending tubular picker bars therearound, each picker bar being oscillable on its vertical axis and having spindles journalled therein and extending outward therefrom, and drive means in each picker bar for the respective spindles, a force feed lubricating system for the picker bars comprising a lubricant manifold carried by and rotatable with the drum, flexible lubricant distribution lines each connected at one end to the manifold and each connected at its other end to a respective picker bar for delivery of lubricant under pressure from the manifold to the picker bars, means on the cotton picker for holding a supply of lubricant, a lubricant metering pump on the cotton picker having an inlet connected to said supply and an outlet connected to said manifold, the connection from said pump to said manifold including means permitting rotation of the drum, and means for intermittently operating the pump through a cycle for forcing a metered charge of lubricant into the manifold, said charge being sufficient for lubrication of all the picker bars, lubricant being forced out from the manifold through said flexible distribution lines to the picker bars and apportioned among the picker bars upon forcing of said metered charge of lubricant into the manifold, said drum comprising a vertical cylindrical barrel having upper and lower heads, the manifold surrounding said barrel at the lower end thereof.

4. A cotton picker as set forth in claim 3 wherein said manifold is interiorly constituted by the lower portion of the barrel and constituted in part by a portion of the lower head.

5. In a cotton picker having a vertical rotary drum carrying a plurality of vertically extending tubular picker bars therearound, each picker bar being oscillable on its vertical axis and having spindles journalled therein and extending outward therefrom, and drive means in each picker bar for the respective spindles, a force feed lubricating system for the picker bars comprising a lubricant manifold carried by and rotatable with the drum, flexible lubricant distribution lines each connected at one end to the manifold and each connected at its other end to a respective picker bar for delivery of lubricant under pressure from the manifold to the picker bars, means on the cotton picker for holding a supply of lubricant, a lubricant metering pump on the cotton picker having an inlet connected to said supply and an outlet connected to said manifold, the connection from said pump to said manifold including means permitting rotation of the drum, and means for intermittently operating the pump through a cycle for forcing a metered charge of lubricant into the manifold, said charge being sufficient for lubrication of all the picker bars, lubricant being forced out from the manifold through said flexible distribution lines to the picker bars and apportioned among the picker bars upon forcing of said metered charge of lubricant into the manifold, said drum comprising a vertical cylindrical barrel having upper and lower heads and a vertical shaft extending upward from upper head, said means permitting rotation of the drum including a swivel connection to the upper end of the shaft, said shaft being passaged for flow of lubricant from the swivel connection, lubricant being delivered to the manifold from the passage in said shaft via a pipe extending down from the upper head on the outside of the barrel.

References Cited in the file of this patent

UNITED STATES PATENTS

| | | |
|---|---|---|
| 2,038,287 | Hawks et al. | Apr. 21, 1936 |
| 2,723,520 | Hubbard | Nov. 15, 1955 |
| 2,743,569 | Barbknecht et al. | May 1, 1956 |
| 2,991,846 | Bystricky et al. | July 11, 1961 |

FOREIGN PATENTS

| | | |
|---|---|---|
| 799,484 | Great Britain | Aug. 6, 1958 |